(No Model.)

J. H. NORTHROP.
WHEEL TIRE.

No. 574,446. Patented Jan. 5, 1897.

Fig. 6. Fig. 4ª

Witnesses.
Louis N. Gowell
Thomas J. Drummond

Inventor.
James H. Northrop.
by Crosby & Gregory
attys.

UNITED STATES PATENT OFFICE.

JAMES H. NORTHROP, OF HOPEDALE, MASSACHUSETTS.

WHEEL-TIRE.

SPECIFICATION forming part of Letters Patent No. 574,446, dated January 5, 1897.

Application filed December 15, 1893. Serial No. 493,720. (No model.)

*To all whom it may concern:*

Be it known that I, JAMES H. NORTHROP, of Hopedale, county of Worcester, State of Massachusetts, have invented an Improvement in Wheel-Tires, of which the following description, in connection with the accompanying drawings, is a specification, like letters on the drawings representing like parts.

This invention relates to pneumatic tires for vehicle-wheels, and particularly that class of tires in which an outer tread-surface provided with rim-engaging edges is detachably secured to the rim, covering and protecting an inflatable air-tube, and my invention has for its object the production of a novel air-tube which may when deflated be readily inserted in or removed from the tread-surface without any liability to injury, the said tube when inflated securing the tread-surface to the rim, deflation of the air-tube permitting the release and removal of one or both of the rim-engaging edges of the tread-surface.

In accordance therewith my invention consists of an air-tube flattened, folded over upon itself, and vulcanized, adapted to be inflated and used in a pneumatic tire, the tube resuming its folded form when deflated, substantially as will be described.

Other features of my invention will be hereinafter described and particularly pointed out in the claims.

Figure 1:
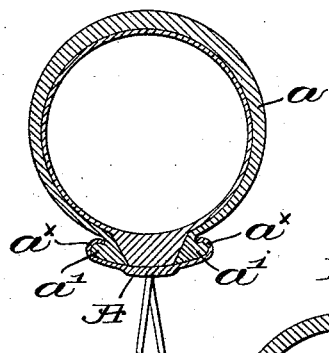
Figure 3:
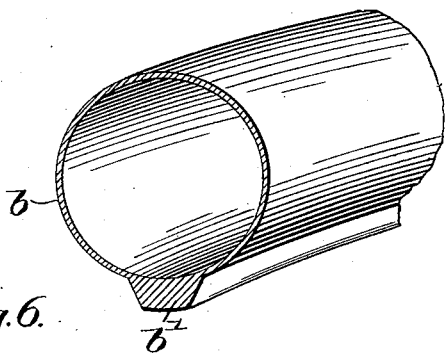
Figure 2:
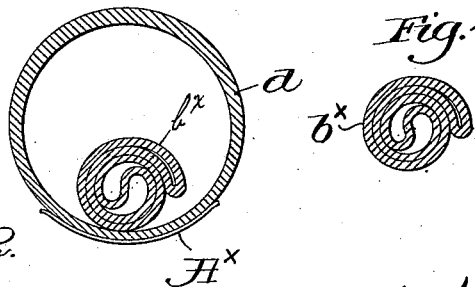
Figure 2:
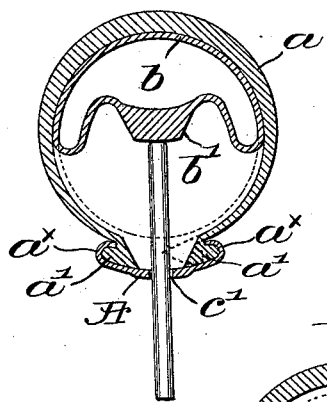
Figure 4:
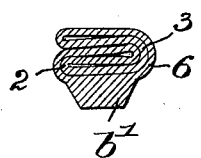
Figure 5:
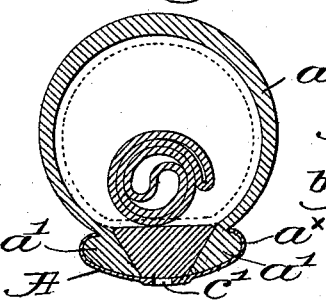

Figure 1 is a transverse sectional view through a wheel rim and tire with my invention embodied therein, the air-tube being inflated and securely locking the tread-surface to the rim. Fig. 2 is a similar view, the air-tube being sufficiently deflated to release the tread-surface. Fig. 3 is a perspective view of a section of the air-tube inflated. Fig. 4 is a cross-sectional view of the air-tube in normal deflated condition folded over upon itself. Fig. 4ª is a similar view of a modification of the air-tube, deflated and folded differently, detached from the locking band or rib. Fig. 5 is a transverse sectional view through the wheel rim and tire with the modified form of tube and detached locking band or rib; and Fig. 6 is a similar view, the tubular tread-surface being cemented to the wheel-rim.

Referring to Figs. 1, 2, and 5, the wheel-rim A is shown as slightly concaved and turned up at each side to form usual flanges $a^\times$. A series of holes are made in the rim, one of such openings being shown at $c'$, Figs. 2 and 5, for a purpose to be hereinafter described.

The annular tread-surface $a$ is composed of elastic material, preferably rubber and canvas or other suitable textile material, made in any usual or desired manner, and its edge portions are enlarged, as at $a'$, to enter the flanged portions $a^\times$ of the rim A when the tread-surface is in working position.

In Fig. 1 the enlarged edges $a'$ of the tread-surface are shown as held or locked in place in the flanged rim by a locking band or rib $b'$, shown in Figs. 1 to 4, as formed on the exterior of the inflatable air-tube $b$, which tube may be provided with a usual nipple for inflating in the well-known manner.

The air-tube is shown as inflated in Fig. 1, and the locking-rib $b'$ is thereby held firmly in place between the edges of the tread-surface and resting in the face of the rim A, so that it is impossible for the said tread-surface to be pulled or moved out of its working position on the rim A.

In Fig. 5 the locking band or rib $b^2$ is shown in position between the edges of the tread-surface resting in the face of the rim, my improved tube $b^\times$ being represented in full lines in normal deflated condition and in dotted lines as inflated and in position to retain the detached locking-band $b^2$ in place.

When the air-tube is deflated and a rod or pin $c$ is inserted in one or more of the holes $c'$ in the rim A, as shown in Fig. 2, and the locking-rib $b'$ of the tube or the separate locking-band $b^2$ (shown in Fig. 5) is pushed out from its locking position between the edges $a'$ of the tread-surface $a$, one or both of the edges may be moved into dotted-line position, Fig. 2, out of engagement with the flange $a^\times$ of the rim and removed therefrom if desired.

In tires of the hereinbefore-described character the deflated air-tube is flattened and inserted by pushing it in through the space between the wheel-rim and the free rim-engaging edge of the tire or tread-surface $a$, the other edge having been first put in place in its rim-flange, and when the air-tube is thought to be in place the free edge of the tread-surface is then placed in its retaining-flange. While this operation is apparently simple it ordinarily requires great care, for otherwise some portion of the deflated air-tube will be caught between the rim-engaging edges or between the rim and the free edge when the latter is pushed into place, pinching the air-tube, so that when the latter is inflated it will burst or the tread-surface will be blown off. Even if the portion pinched should not result in such an accident immediately it will occur sooner or later, for the tube will be cut at the pinched portion. In order to overcome such objections and thereby avoid accidents to the air-tube, and also to facilitate the introduction or removal thereof, I preferably vulcanize the air-tube, as shown in section in Figs. 4 and 4$^a$. The tube is flattened and then folded over upon itself, as at 2, after which the remaining portion is bent, as at 3, and folded over the first part, as in Fig. 4, or is folded in a coil, as in Fig. 4$^a$, and the tube is then vulcanized, so that whenever it is deflated it will at once assume substantially such a form.

The tube so constructed is easily introduced within or withdrawn from the tread-surface between the free engaging edge of the latter and the rim without presenting any narrow portion to be nipped or pinched when the tread-surface is replaced.

The locking band or rib may be separate from the inflated tube or secured to or forming a part thereof, the tube in either case folding over upon itself when deflated.

In Fig. 6 the tread-surface or tire $d$ is cemented to the wheel-rim A$^\times$, and the inflatable tube $b^\times$ is shown therein in deflated position, and it is evident that in this construction a locking band or rib is unnecessary.

My invention is not restricted to the precise construction and arrangement of parts as herein described, as the same may be altered or modified without departing from the spirit of my invention.

I claim—

1. An air-tube, folded over upon itself and vulcanized, adapted to be inflated and used in a pneumatic tire, the tube resuming its folded form when deflated, substantially as described.

2. An air-tube, folded over upon itself and vulcanized, and provided with an external integral band or rib, adapted to be inflated and used in a pneumatic tire, the tube resuming its folded form when deflated, substantially as described.

3. A pneumatic tire consisting of an annular tread-surface, combined with an inflatable air-tube flattened and folded over upon itself and vulcanized, whereby the tube resumes its folded form when deflated, substantially as described.

4. A pneumatic tire consisting of an annular tread-surface provided with rim-engaging edges, and a rim having retaining-flanges therefor, combined with an inflatable air-tube folded over upon itself and vulcanized to normally maintain itself in said folded-over form, whereby insertion or removal of the tube between the rim and the free edge of the tread-surface is facilitated, substantially as described.

5. A pneumatic tire consisting of an annular tread-surface provided with rim-engaging edges, and a rim having flanges to receive said edges, combined with an inflatable air-tube flattened, folded over and vulcanized and provided with an external band or rib adapted to enter between the edges of the tread and retain them in the rim-flanges, substantially as described.

In testimony whereof I have signed my name to this specification in the presence of two subscribing witnesses.

JAMES H. NORTHROP.

Witnesses:
GEO. OTIS DRAPER,
A. W. BEARDSELL.